United States Patent [19]
Lau

[11] Patent Number: 5,811,200
[45] Date of Patent: Sep. 22, 1998

[54] RECHARGEABLE BATTERY DEVICE

[75] Inventor: Wai-Check Lau, Hong Kong, Hong Kong

[73] Assignee: Go-Gro Industries Ltd., Kowloon, Hong Kong

[21] Appl. No.: 587,919

[22] Filed: Jan. 17, 1996

[51] Int. Cl.⁶ .............................. H01M 2/10; H01M 2/30
[52] U.S. Cl. ............................... 429/1; 429/96; 429/100; 429/178
[58] Field of Search ................................ 429/1, 178, 100, 429/96

[56] References Cited

U.S. PATENT DOCUMENTS 4,513,068  4/1985  Field et al. .
4,595,641  6/1986  Giurtino .
5,104,752  4/1992  Baughman et al. .
5,194,340  3/1993  Kosako .

*Primary Examiner*—John S. Maples
*Attorney, Agent, or Firm*—Morey B. Wildes; Cowan, Liebowitz & Latman, P.C.

[57] ABSTRACT

The present invention relates to an improved rechargeable battery device, particularly an improvement over the structure of the positive and negative terminals of a rechargeable battery, and of some parts of a charging device therefor. By adding a convex ring round the conventional terrace-shaped positive terminal of a rechargeable battery, which ring, formed integrally with said positive terminal, is for an elastic contactor from a charger to contact; and by forming an insulated central concave in the negative terminal to replace the conventional planar negative terminal, it is possible to avoid explosions caused by charging a non-rechargeable battery. Moreover, due to the above-said improvement, mixed use of rechargeable and non-rechargeable batteries is also made possible.

6 Claims, 1 Drawing Sheet

RECHARGEABLE BATTERY DEVICE

FIELD OF THE INVENTION

This invention pertains to a rechargeable battery, and more particularly to electrodes for a rechargeable battery.

BACKGROUND OF THE INVENTION

In the prior art, there are many kinds of rechargeable batteries. Some use soldered positive and negative terminals, in which case the battery is, more often than not, sealed in a case which cannot be opened. So long as the rechargeable battery has come to the end of its life, since the used battery cannot be taken out, the device as a whole (for instance, an electric torch with a rechargeable battery) is good for nothing. Others have a terrace-shaped positive terminal (8 mm in diameter and 3 mm high) and a planar negative terminal (23 mm in diameter) in the same structure as the conventional non-rechargeable batteries (the R20 battery, for instance).

To make the terminals of a rechargeable battery the same as those for a non-rechargeable battery has the advantage in that the device as a whole can continue to be used by replacing used batteries; besides, use of different kinds of batteries is also possible. However, if a rechargeable battery is mixed with a non-rechargeable one, or if the latter is charged by mistake, an explosion may possibly happen.

SUMMARY OF THE INVENTION

It is an object of this invention to provide an improved rechargeable battery, free from the above-said shortcomings; another object of the present invention is to provide structurally improved positive and negative terminals for a rechargeable battery, as well as an elastic contactor from a charger therefor, so that even if a non-rechargeable battery is mixed in, mixed use is still possible without any danger of explosion.

BRIEF DESCRIPTION OF THE DRAWINGS

The above-mentioned, as well as other, advantages of the present invention will be clearly seen through a detailed description below with reference to the attached drawings, wherein.

DESCRIPTION OF THE INVENTION

Figure 1:
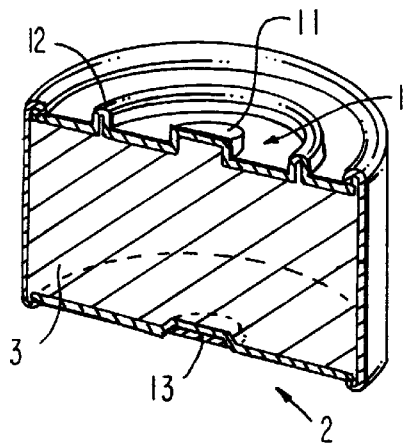
FIG. 1 is a perspective, cross-sectional view of the positive and negative terminals of a rechargeable battery according to the present invention.

To realize the object of this invention, the positive and negative terminals of a rechargeable battery are structurally improved so that the positive terminal 1 is made to consist of an integral piece having a cylindrical protrusion 11 in the centre and a concentric convex ring 12 round the former, while the negative terminal is made to consist of a round piece 2 having a central concave, portion 13 10 mm in diameter, which concave portion 13 is covered by insulation material, so as to prevent conduction even if in contact with the positive terminal of a non-rechargeable battery. An additional elastic contactor 17 is provided with the charger 5 for contacting the convex ring 12 of the positive terminal 1, such that both non-rechargeable and rechargeable batteries can be used, and that even if a non-rechargeable battery is mixed in, charging could not be performed, thus avoiding a possible explosion.

Figure 6:
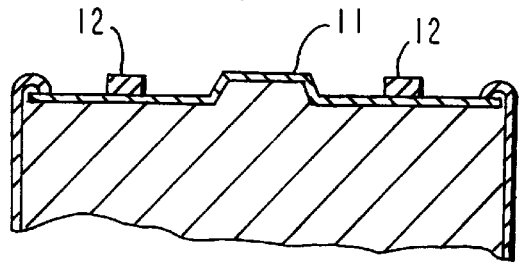
FIG. 6 is a section view of the positive terminal of a conventional rechargeable battery showing a convex plastic ring adhered thereto.

As above described, an improved rechargeable battery according to the present invention comprises a positive terminal 1 formed by an integral metal piece, which has a central terrace to contact an upper positive terminal 4 of a battery chamber leading to a load, and a convex ring 12 surrounding round said central cylindrical protrusion 11 to contact an elastic contactor 17 from a charger 5; and further a negative terminal 2 having an insulated concave portion 13, 10 mm in diameter (for the R20 type battery), so that if a non-rechargeable battery's positive terminal touches upon said concave portion, no conduction occurs. In order that conventional rechargeable batteries can also be used in the present device, a separate plastic ring 12 can be glued onto the positive terminal 11 end of the battery, as shown in FIG. 6, so that when fitted into the present device, said plastic ring 12 will push upon said elastic contactor 17, for the latter to touch flange F of the battery chamber upper terminal 4, thus making possible both charging and discharging.

A device as above described can realize simultaneous charging of a battery and discharging through a load. A lower terminal 6 having the shape of a cylindrical cup with a surrounding rim is provided for the battery chamber, to match said negative terminal 2 of the battery, so that in use the rim of said terminal 6 is in touch with the ring portion of the battery's negative terminal 2 round its insulated central concave portion 13. Said cylindrical cup lower terminal has a depth a little larger than that of the cylindrical protrusion 11 on a battery's positive end.

Referring to FIG. 1, an improved rechargeable battery according to the present invention comprises a positive terminal 1 and a negative terminal 2, said positive terminal 1 being formed by an integral piece having a central cylindrical protrusion 11 and a concentric convex ring 12, and said negative terminal 2 having a central concave portion 13 that is insulated through coating with insulation paint, such as resin, varnish, etc., or with an insulation paper label. It should be noted here that since the internal structure of the rechargeable battery (such as the flange F) is not altered, depicted in FIG. 1 are only the two terminals.

Figure 2:
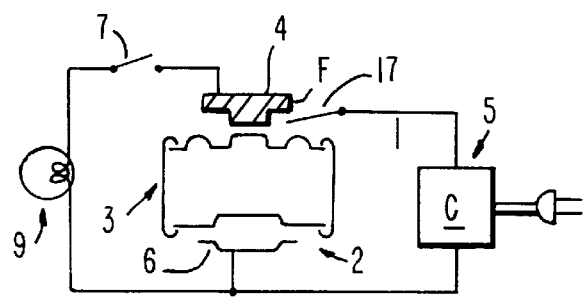
FIG. 2 is a circuit diagram to show how in the present invention a rechargeable battery device (in this case, a rechargeable electric torch) and a charging device work.

In FIG. 2, three components are seen, namely, a bulb 9, a rechargeable battery 3, and a charger 5. Notwithstanding the fact that the three components may have very complicated circuits, for simplicity, a simple illustration is used to explain the working principle. The bulb 9 is a load. While the central terrace 11 of the battery's positive terminal 1 is in contact with the battery chamber's upper terminal 4, the convex ring 12 is simultaneously in touch with an elastic contactor 17 from a charger 5. The battery chamber lower terminal 6 is hat-shaped and is in contact only on its brim with the conductive ring portion of said negative terminal 2. So as long as a switch 7 is closed, the bulb 9 will light; and so long as the plug of the charger 5 is connected to power, charging of the battery will occur.

Figure 3:
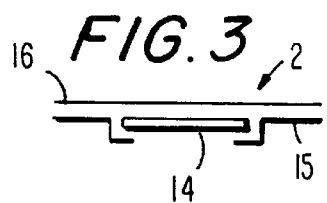
FIG. 3 is a section view of another embodiment of the negative terminal of a rechargeable battery according to the present invention.

FIG. 3 is an alternative structure of the battery's negative terminal 2. Here, an insulation piece 14 is placed between two conductive pieces 15 and 16, the former having a central opening. In this manner, the central portion of the battery's negative terminal 2 is also made to be insulated.

Referring to FIGS. 1–3, if a non-rechargeable battery is put into the device, since its positive terminal 1 does not have a convex ring 12 round the central cylindrical protrusion 11, the elastic contactor 5-1 in FIG. 2 cannot touch the positive terminal 4, thus making charging impossible, and avoiding a possible explosion. Now, if more than one battery in series are put into the device described in FIG. 2, nothing dangerous will happen. If the battery on top is a non-rechargeable one, as already described above, since no convex ring is provided on its positive terminal 1, contact between said positive terminal 1 and the elastic contactor 17 is impossible; if the one at the bottom of said series is non-rechargeable, since its positive terminal 1 is merely a central cylindrical protrusion 11 which comes into touch with the central insulated portion 13 of the negative terminal 2 of the upper rechargeable battery, charging is also made impossible. Inasmuch, no matter how many non-rechargeable batteries in series are put inside, charging is always impossible. However, if a non-rechargeable battery is put above a rechargeable battery, the bulb 9 can still be lit up. In this way, while explosion is completely avoided, mixed use of rechargeable and non-rechargeable batteries in series is still permitted.

Figure 4:
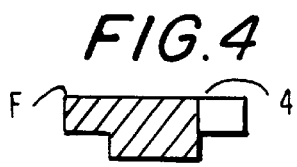
FIG. 4 shows another embodiment of a battery chamber positive terminal for a rechargeable battery device according to the present invention.
Figure 5:
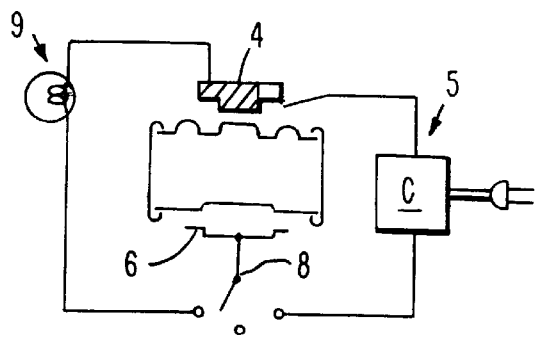
FIG. 5 is another circuit diagram showing use of the rechargeable battery device of the present invention, for charging and discharging to be performed separately.

If, under certain circumstances, simultaneous charging and discharging are not allowed, the portion of the battery chamber's upper terminal 4 which is towards said contactor 17 can be cut off, as illustrated in FIG. 4. At the same time, as is seen in FIG. 5, a shunt switch 8 is used instead of the former switch 7.

Another advantage of the present invention is as follows. With a device in the prior art, if the batteries are placed upside down, the bulb will still light; however, charging is absolutely impossible and may even destroy the device. In the present invention, if batteries (rechargeable or non-rechargeable) are put upside down, neither the bulb will light, nor will charging start. For if the upper battery is one according to the present invention, the insulated central portion 13 of its negative terminal 2 is in touch with the battery chamber's upper terminal 4; and if the lower one is a conventional battery, its positive terminal 1 cannot touch the bottom of the hat-shaped battery chamber's lower terminal.

To sum up, the improvement according to the present invention does not have any high requirements for production facilities, and the cost is also very low. Apart from about 10% increase in blanking size for making the battery's positive terminal, provision on the battery's negative terminal of a concave portion is also quite easy; and where an insulation paper label is used, it can simultaneously serve as a quality control mark. Therefore, increase of cost is minimal, while the advantages are obvious that mischarging non-rechargeable batteries can be avoided, and mixing of a non-rechargeable battery can be checked out automatically. Moreover, troubles occurring because of batteries being placed upside down can also be avoided. All these make the rechargeable battery device of the present invention very easy and convenient and safe to use.

What is claimed is:

1. A rechargeable battery device, comprising a rechargeable battery housed in a battery chamber, said rechargeable battery having a battery body, a positive terminal and a negative terminal; said positive terminal being made of an integral metal sheet, having a cylindrically protruding portion and a convex ring situated concentrically around said cylindrically protruding portion; said negative terminal being made of a round metal sheet having a central concave portion which is insulated, said concave portion being surrounded by a conductive portion; a battery chamber's upper terminal having a downward protrusion to touch the cylindrically protruding portion on said battery's positive terminal and having a flange; and a battery chamber lower terminal having a downward central concave portion and a rim surrounding said concave portion to touch the conductive portion surrounding the central concave portion of said negative terminal of the battery.

2. A rechargeable battery device as claimed in claim 1, wherein said lower terminal of said battery chamber has a depth larger than the height of the cylindrically protruding portion of a battery's positive end.

3. A rechargeable battery device, as claimed in claim 1, wherein said negative terminal of said battery comprises an insulation sheet placed between an upper integral metal sheet and a lower metal sheet, said lower metal sheet having a central opening smaller than said insulation sheet.

4. A rechargeable battery device as claimed in claim 1, wherein said battery chamber upper terminal has a portion of said flange proximate an elastic contactor removed, whereby charging or discharging is realized separately by means of a shunt switch in an electrical circuit connected to said upper and lower terminals.

5. A rechargeable battery device as claimed in claim 1, wherein rechargeable batteries having a protruding positive terminal are contained in said device, with a separate plastic ring glued to a positive end of an uppermost battery, to push upon an elastic contactor, for the latter to touch the flange of said battery chamber upper terminal.

6. A rechargeable battery, comprising a battery body, a positive terminal and a negative terminal, said positive terminal being made of an integral metal sheet, having a cylindrically protruding portion and a concentric convex ring around said cylindrically protruding portion; said negative terminal being made of a round metal sheet with a central concave portion, said concave portion being insulated.

* * * * *